United States Patent Office 3,136,468
Patented June 9, 1964

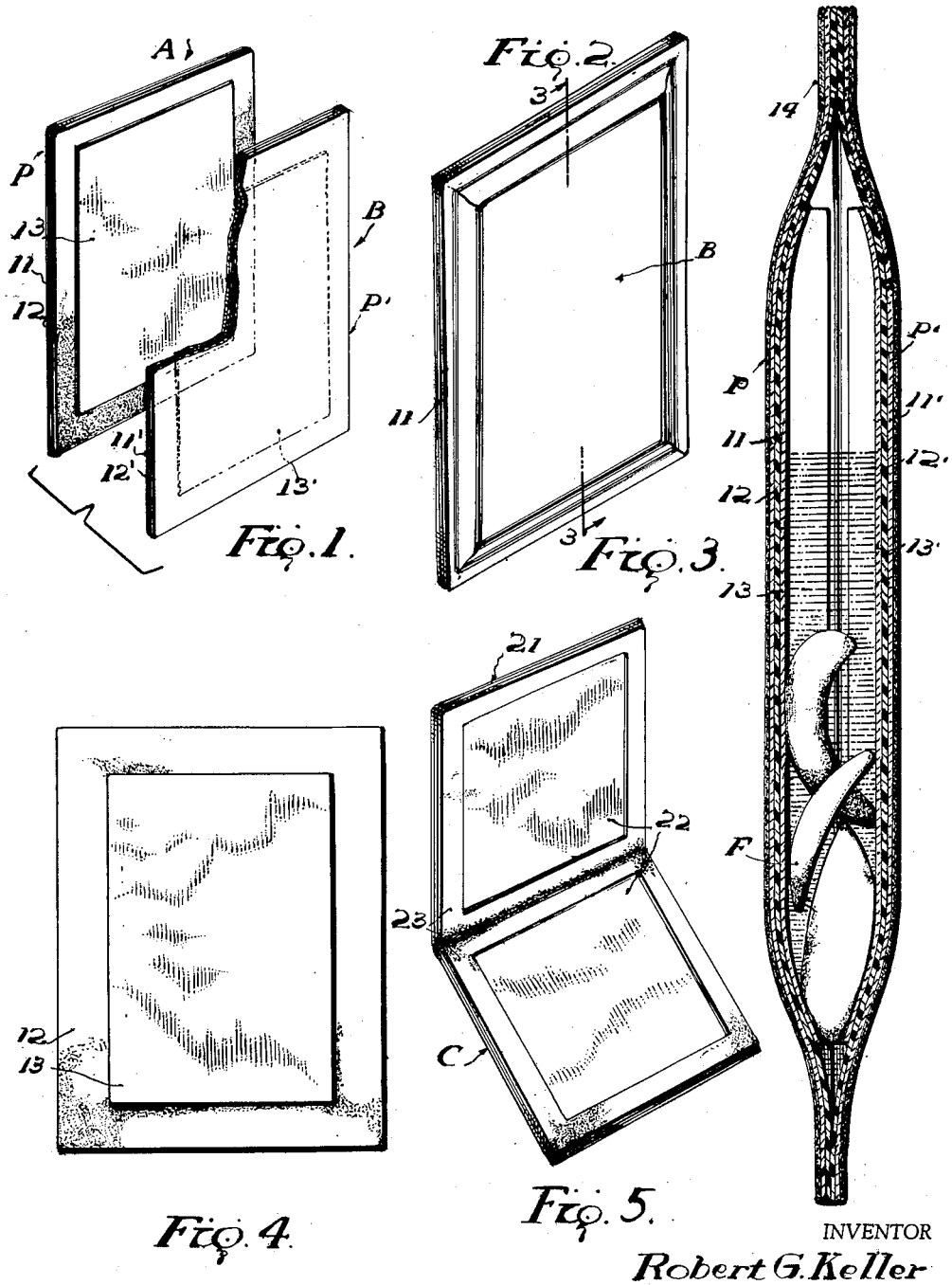

3,136,468
FLEXIBLE PACKAGE FOR STERILE FOODS
Robert G. Keller, Chicago, Ill., assignor to the United States of America as represented by the Secretary of the Army
Filed July 30, 1962, Ser. No. 213,558
1 Claim. (Cl. 229—3.5)
(Granted under Title 35, U.S. Code (1952), sec. 266)

The invention described herein, if patented, may be manufactured and used by or for the Government for governmental purposes, without the payment to me of any royalty thereon.

The invention relates to a heat-sealed protective pouch for certain thermal processed foods of the character described, made of plastics material (preferably laminated to metal foil) with a heat seal along the edges of the plastics laminae, and having on its inner surfaces panels of metallic foil in contact with the food. This arrangement hermetically seals the food against outside sources of contamination, and simultaneously protects the food against oxidative deterioration by the reducing action of the metallic panels.

There have been developed in recent years laminated sheets of metallic foil and plastics, e.g., laminates of vinyl resins, aluminum foil, and polyethylene terephthalate, or polyolefins, foil, and water-resistant paper. These sheets can be made into pouches, either by heat-sealing two sheets along their edges, with the heat-sealable plastic laminae facing each other; or a pouch can be made by doubling the sheet upon itself, and heat-sealing the thus doubled sheet along the three free edges, again with the heat-sealable plastic laminae facing each other. Such combinations are desirable because of the heat-sealable properties of the vinyl or polyolefin resins, the low degree of gas and moisture permeability imparted by the foil and the scuff and puncture resistance and general improvement in rough handling characteristics contributed by the polyethylene terephthalate or other exterior laminae. Such pouches have weight and shape advantages when used in lieu of rigid metal containers for military rations carried in a knapsack or combat uniform pocket, and would be similarly desirable for many civilian uses.

It has been found that a number of delicate foods, such as fruit products and the like, do not keep well when thermally processed and stored in heat-sealed pouches of this character partly because the oxygen contents of the air entrapped in the pouch reacts chemically with the wet food, resulting in undesirable color and flavor changes, and partly because of other oxidation-reduction phenomena not necessarily involving oxygen. This oxidative deterioration could be retarded or entirely eliminated if the food were in contact with the metallic laminae of the pouch instead of the plastics laminae, as the reducing action of the metal would counteract the undesirable oxidative change.

I have found that the advantages of a secure heat seal between the plastics laminae of a food pouch made from metal and plastics laminated sheet material can be realized, and the food contents simultaneously protected against oxidative deterioration, by adhering metallic panels to the inner plastic walls of the pouch and heat-sealing the free edges of the pouch-forming walls with the plastics laminae facing each other, thus enabling the formation of a strong heat-sealed circumscribing fin. In this manner the food contents are contiguous to the metal foil (e.g., tin foil) and are protected against oxidative deterioration by the reducing action of the panels. Mere insertion of a loose strip or piece of metal in the pouch is not practical, as it has a tendency to work itself into a corner and thereby to minimize its protective contact with the food.

My invention is also applicable to heat-sealed pouches made of a foil-plastic or foil-paper laminate where the plain foil surfaces of the sheets are face to face with a band of heat-sealable plastic adhered to the foil or adhesive applied only to the peripheral area where it is desired to make a heat seal. However, such an arrangement is presently less preferred because equipment for mechanically applying adhesive or heat-sealable plastic to the peripheral area has not been employed to date.

My invention is also applicable to heat-sealed pouches made of plastics material only (i.e., without an outside metallic layer). In such a case, the protective metallic panel is likewise adhered to the inside of at least one of the pouch walls. This method sacrifices some strength and permeability in the areas adjacent to the heat seals.

It is accordingly a principal object of my invention to provide a protective food pouch of the character described, which can be strongly heat-sealed with conventional machinery, and which chemically protects against undesired oxidation deterioration of the contents.

Another object of my invention is a strong and inexpensive pouch of the foregoing character wherein a heat seal is provided between two plastics layers and wherein the pouch-forming blanks have incorporated therein a pair of electropositive metallic panels in contact with the food contents of the pouch.

A further object of my invention is a laminated food pouch wherein plastics laminae face each other for the formation of a strong plastics-to-plastics heat seal, while at the same time providing for protection of the food contents of the pouch by the reducing action of metallic panels of material inside the pouch.

Other objects and advantages of my invention will appear from the following description of a preferred embodiment of the same and of a modification thereof, which description is intended for purposes of illustration and not of limitation.

In the accompanying drawings:

FIG. 1 is a perspective exploded view, partly broken away, of the components of the pouch prior to heat-sealing;

FIG. 2 is a perspective view of the pouch after heat-sealing;

FIG. 3 is an enlarged sectional view corresponding to FIG. 2, taken along lines 3—3 thereof;

FIG. 4 is an elevational view of one of the blanks for forming a pouch of FIG. 2, showing the protective electropositive metallic panel in position;

FIG. 5 is a perspective view of a blank for making a modified pouch according to my invention.

More particularly, in the preferred embodiment of the pouch of FIGS. 1 to 4, reference characters A and B denote two sheets, cut to size, of laminated flexible sheet material, wherein the outer laminae 11, 11' are metal foil, such as aluminum, tin, copper, silver or other suitable metal, preferably, but not necessarily faced with outermost surfacings P, P' of polyethylene terephthalate ("Mylar"), sized paper, or other strong water-resistant materials. Inner laminae 12, 12' are of heat-sealable plastics material, such as polyethylene, polypropylene, vinyl polymers; etc. A pair of large electropositive metal panels 13, 13' (e.g., of tin), is adhesively connected to plastics laminae 12, 12', so as to face inwardly; they are of sufficient area to extend over substantially the entire interior space of the pouch (except for its heat-sealable seam area as will be more fully explained). The adhesive connection between laminae 12, 12' and panels 13, 13' can be effected, e.g., by spots of rubber cement, or by a heat seal (which need not be strong, as it will not be subjected to appreciable stress).

The pouch is hermetically heat-sealed after insertion of the food material F (e.g., sliced peaches in sugar syrup).

The heat seal is between the edges of the plastics laminae 12 and 12' of sheets A and B, and forms a strong rectangular circumscribing fin 14, clear of metal panels 13, 13'.

In the presently less preferred modification of FIG. 5, there is provided a rectangular blank C of flexible laminated sheet material, having an outer plastics lamina 21 and a coextensive metallic lamina 22, of electropositive metallic foil (e.g., tin foil). The blank is then folded along its center line, with electropositive metallic foil lamina 22 on the inside; then food is inserted between the walls thus formed, and sealing is effected along the free edges of the blank, e.g., by bonding with a suitable adhesive, such as vinyl resin or polyolefin (e.g., polypropylene). The adhesive is preferably applied in advance (e.g., prior to folding of the blank C) to the marginal and central areas 23 of metallic foil lamina 22 by roll-coating of a hot metal (which is then permitted to solidify at room temperature); final closing of the filled pouch C may be conveniently effected, e.g., by heat-activating the previously applied adhesive.

It will thus be seen that I have provided a simple, inexpensive and sturdy food pouch for sterile foods and the like, with the heat seal in a favorable position between two plastics faces which are capable of forming such a strong seal and circumscribing fin; and that I have provided an arrangement whereby the reducing action of a metallic wall or panel affixed to the interior of the pouch counteracts undesired oxidative deterioration of the food contents. I prefer tin for this protective panel; however, other electropositive metals, i.e., metals being more electropositive than hydrogen in the electromotive series of elements, may be substituted, such as magnesium, aluminum, magnesium-aluminum alloy, etc. Metals more electropositive than tin in the electromotive series (e.g., aluminum) may liberate hydrogen gas when used with low pH foods, and for this reason are less desirable than tin, in such foods; however, they are quite suitable for foods having a more nearly neutral pH.

Having thus described a preferred form of my invention and a modification of the same, it will be appreciated that departures from the specific embodiments shown may be made without departing from the scope and spirit of my invention. I thus intend to encompass such changes and modifications within the scope of the invention as hereinafter claimed.

I claim:

A protective pouch adapted to contain a comestible which is highly susceptible to oxidative deterioration, said pouch comprising two flexible sheets, each of said sheets comprising at least two laminae, at least one laminae of each sheet comprising a heat sealable plastic foil, said plastic laminae of said sheets facing each other and being heat sealed together at their edges to form a flat circumscribing fin, a pair of panels of electropositive metallic foil, the metals of said last named foils being selected from a group consisting of tin, aluminum, magnesium and magnesium-aluminum alloys, said panels being fixed to said plastic laminae of said sheets inwardly of said pouch, in facing relation to each other, said panels having inner surfaces which are fully exposed to the interior of said pouch, and said panels being complementary in shape to said sheets and being concentrically disposed thereon in slightly inwardly spaced relation to said fin whereby to substantially entirely cover the inner surfaces of said pouch.

References Cited in the file of this patent
UNITED STATES PATENTS

| | | |
|---|---|---|
| 1,217,818 | Peterson | Feb. 27, 1917 |
| 2,400,390 | Clunan | May 14, 1946 |
| 2,554,157 | Snyder | May 22, 1951 |
| 2,633,284 | Moffett et al. | Mar. 31, 1953 |

OTHER REFERENCES

Refrigerating Engineering, February 1954.

Modern Packaging, April 1955. (Copy in Scientific Library.)